(12) United States Patent
Hild et al.

(10) Patent No.: US 9,733,071 B2
(45) Date of Patent: Aug. 15, 2017

(54) METHOD OF THREE-DIMENSIONAL MEASUREMENTS BY STEREO-CORRELATION USING A PARAMETRIC REPRESENTATION OF THE MEASURED OBJECT

(71) Applicants: CENTRE NATIONAL DE LA RECHERCHE SCIENTIFIQUE, Paris (FR); ECOLE NORMALE SUPERIEURE DE CACHAN, Cachan (FR)

(72) Inventors: François Hild, Chatenay Malabry (FR); Stéphane Roux, Rosny-sous-Bois (FR)

(73) Assignees: Centre National De La Recherche Scientifique, Paris (FR); Ecole Normale Superieure de Cachan, Cachan (FR)

( * ) Notice: Subject to any disclaimer, the term of this patent is extended or adjusted under 35 U.S.C. 154(b) by 216 days.

(21) Appl. No.: 14/404,918

(22) PCT Filed: May 24, 2013

(86) PCT No.: PCT/EP2013/060701
§ 371 (c)(1),
(2) Date: Dec. 1, 2014

(87) PCT Pub. No.: WO2013/178540
PCT Pub. Date: Dec. 5, 2013

(65) Prior Publication Data
US 2015/0153162 A1 Jun. 4, 2015

(30) Foreign Application Priority Data
Jun. 1, 2012 (FR) ..................... 12 55093

(51) Int. Cl.
*G01B 11/245* (2006.01)
*G06T 7/80* (2017.01)
*G06T 7/593* (2017.01)

(52) U.S. Cl.
CPC ............ *G01B 11/245* (2013.01); *G06T 7/593* (2017.01); *G06T 7/85* (2017.01)

(58) Field of Classification Search
CPC ......... G06T 7/292; G06T 17/00; G06T 19/20; H04N 5/23238; H04N 13/0271; H04N 13/0242; H04N 13/0246; G06K 9/6211
See application file for complete search history.

(56) References Cited

U.S. PATENT DOCUMENTS

2005/0259882 A1* 11/2005 Dewaele ................. G06T 7/606
382/243
2006/0052687 A1* 3/2006 Ruohonen ................ A61N 2/02
600/410

(Continued)

FOREIGN PATENT DOCUMENTS

WO 2009/157895 A1 12/2009

OTHER PUBLICATIONS

International Search Report dated Aug. 28, 2013 from Application No. PCT/EP2013/060701.

(Continued)

*Primary Examiner* — Hung Dang
*Assistant Examiner* — Sunghyoun Park
(74) *Attorney, Agent, or Firm* — Baker Hostetler LLP

(57) ABSTRACT

In the field of methods of three-dimensional measurement of an object by stereo-correlation, methods require at least two cameras connected to image processing means. These methods include at least a first step of calibration of the two image planes and a second step of spatial matching between these two image planes. These two steps can be followed by a (Continued)

third step of temporal matching. The method provided requires objects, the surface of which has a parametric representation, i.e. a mathematical representation of the object surface having the form of a decomposition over a scalar function basis. The parametric representation is implemented during the first calibration step and/or during the second and third steps of spatial or temporal matching.

8 Claims, 3 Drawing Sheets

(56) References Cited

U.S. PATENT DOCUMENTS

| | | | |
|---|---|---|---|
| 2008/0123937 A1 | 5/2008 | Arias Estrada et al. | |
| 2009/0295908 A1* | 12/2009 | Gharib | G01B 11/002 348/46 |
| 2009/0296985 A1* | 12/2009 | Lv | G06T 7/292 382/103 |
| 2011/0102550 A1* | 5/2011 | Daniel | G06T 7/0065 348/46 |
| 2011/0248997 A1* | 10/2011 | Munkberg | G06T 17/20 345/423 |

OTHER PUBLICATIONS

Tetsuo Miyake, et al., "Online Stereo Measurement System for a Sand Mold" SICE-ICCAS 2006, Oct. 1, 2006 (Oct. 1, 2006), pp. 4047-4050, XP031049974, ISBN: 978-89-950038-4-8, Section 2.1, International Joint Conference IEEE, Piscataway, NJ USA.

Cordes, K. et al., "Extrinsic Calibration of a Stereo Camera System Using a 3D CAD Model Considering the Uncertainties of Estimated Feature Points," Visual Media Production, 2009. CVMP '09, Nov. 12, 2009 (Nov. 12, 2009), pp. 135-143, XP031648071, ISBN: 978-1-4244-5257-6, Conference for IEEE, Piscataway, NJ USA.

G. Besnard, et al., ""Finite-Element" Displacement Fields Analysis from Digital Images: Application to Portevin-Le Chatelier Bands", Experimental Mechanics, 2006, pp. 789-804, vol. 46.

Gilles Bernard, et al., "Characterization of Necking Phenomena in High Speed Experiments by Using a Single camera", EURASIP Journal on Image and Video Processing, 2010, vol. 215956, pp. 1-8.

* cited by examiner

CALIBRATION STEP

METHOD OF THREE-DIMENSIONAL MEASUREMENTS BY STEREO-CORRELATION USING A PARAMETRIC REPRESENTATION OF THE MEASURED OBJECT

CROSS-REFERENCE TO RELATED APPLICATIONS

This application is a National Stage of International patent application PCT/EP2013/060701, filed on May 24, 2013, which claims priority to foreign French patent application No. FR 1255093, filed on Jun. 1, 2012, the disclosures of which are incorporated by reference in their entirety.

FIELD OF THE INVENTION

The general field of the invention is that of methods of three-dimensional measurement of objects by optical means, these methods offering the advantage of measurement without contact with the object. More precisely, the field of the invention is that of methods using stereo-correlation. These methods are also known by the acronym 3D-DIC meaning "Three-Dimensional Digital Image Correlation".

BACKGROUND

In general, stereo-correlation methods require at least two capturing cameras making it possible to capture images of the object to be measured from two different angles and means for analyzing and processing the images output by these two cameras. The measurement principle is illustrated in FIG. 1. The surface of an object O is represented by a set of points M with coordinates (x,y,z) in a reference frame (X, Y, Z) linked to the object. In the reference frame (U1, V1) of the image plane of the first camera, the image of the point M is at M1 with coordinates (u1, v1) and in the reference frame (U2, V2) of the image plane of the second camera, the image of the point M is at M2 with coordinates (u2, v2). Knowing the two transfer matrices between the reference frame (X, Y, Z) and the reference frames (U1, V1) and (U2, V2), it is then possible to find the coordinates of each point M of the object, knowing the coordinates of its two projections M1 and M2 in the image planes of the two cameras.

To the extrinsic parameters that are these changes in reference frame are added intrinsic quantities such as the focal lengths of the lenses of the cameras, the scale parameters or else the coordinates of the focal points that characterize each of the image capturing means used. These two sets of parameters must be known in order to be able to reconstruct the three-dimensional surface shapes of the object. Note that the two sets of parameters can be grouped to define the transfer matrix associated with each camera; the latter being determined without necessarily having to distinguish between the intrinsic and extrinsic parameters.

Stereo-correlation methods include two main steps which are on the one hand a calibration step and on the other hand a spatial matching step enabling the determination of the geometrical features of the measured object. These first two steps can be followed by a third step of tracking the geometrical features over time. The latter step is useful when the object undergoes processing likely to induce deformation, for example when the object is subject to a mechanical strength test or during a manufacturing or assembly method.

As seen in the previous paragraph, it is essential to have full knowledge of the link existing between the reference frame of the object and the reference frame of the image planes of the two cameras. To perform this calibration step, a template—a three-dimensional calibration test pattern, the geometry of which is fully known—is used. By way of example, FIG. 2 represents the calibration of the image plane of the camera 1. The calibration test pattern $M_E$ is composed of one or of two planar surfaces forming a known angle between themselves. Each surface is covered with distinctive black and white geometrical shapes which can be rectangles or discs, for example. The test pattern in FIG. 2 is thus covered with a black and white checkerboard pattern.

In the example in FIG. 2, three points on the checkerboard pattern P1, P2 and P3 of known position give three projected images I1, I2 and I3 of known position in the image plane of the camera 1. It has been demonstrated that at least eight calibration points are required to obtain a calibration of the measurement system, i.e. the determination of the elements of the transfer matrices. The camera lenses not being fully alike and including optical aberrations, the calibration phase can also introduce aberration corrections for each camera and then requires a larger number of measurement points. This phase is, of necessity, complex if a high accuracy of measurement is desired within a given volume of measurement.

The function of the spatial matching step consists in finding in the two image planes the two projection points M1 and M2 corresponding to one and the same object point M. These points being determined, it is then possible to retrieve the three-dimensional coordinates of the point M. Various methods are implemented to perform this matching. They are based on a Digital Image Correlation code, also known by the acronym "DIC".

Various types of DIC code exist. A first type consists in performing local correlations between the two images of one and the same object so as to detect for a point M1 belonging to the first image plane the corresponding point M2 in the second image. To perform this correlation, the images are divided into "thumbnails" of small dimensions. Thus, a thumbnail can be a square, consisting of 16×16 pixels for example. For a first determined thumbnail belonging to the first image plane, the second corresponding thumbnail is sought in the second image plane. Given that the thumbnails are of small dimensions, it is possible to consider that the second thumbnail is obtained by a simple transform of the first thumbnail, i.e. a translation, and often a displacement of constant gradient on the thumbnail, or optionally more complex transforms. In this way the correlation computations are greatly simplified, taking into account the local nature of the analysis. However, this method, by its very nature, does not take into account transforms more complicated than those used in the analysis but which are likely to exist between the two thumbnails. In addition, the regularity of the displacement field, which translates, for example, into the continuity, or differentiability existing between contiguous thumbnails, is not taken into account.

It will be understood that, to obtain a high spatial resolution, the dimensions of the thumbnails are reduced, but in doing so, the correlation becomes more sensitive to noise and the determination of the transfer matrices becomes more uncertain.

A second type of DIC code consists in performing a global correlation between the two images. In this case, an attempt will be made to determine the whole displacement field existing between the two images so as to obtain the smallest possible difference between the two images. To perform this step, it is considered that the two images are described by gray level variations, which are a function of the spatial coordinates captured in the two image planes. These two images are denoted $f(x)$ and $g(x)$, x representing the coordinates of the points belonging to the two images. It is then considered that the second image is equal to the first image to within a displacement field denoted u(x). The following equation is obtained:

$$f(x)=g[x+u(x)] \quad \text{Relationship 1}$$

The displacement field u(x) is determined by minimizing over the whole volume of the object the quadratic difference existing between the two sides of relationship 1, the displacement field being decomposed over a basis of suitable functions.

For more information on this method, the reader is referred, in particular, to a first article entitled ""Finite-element" displacement fields analysis from digital images: Application to Portevin-Le Châtelier bands", published in "Experimental Mechanics 46 (2006) 789-804" by Gilles Bernard, François Hild and Stéphane Roux and also to a second article entitled "Characterization of necking phenomena in high speed experiments by using a single camera", published in "EURASIP Journal on Image and Video Processing 2010 (2010) 215956" by Gilles Bernard, Jean-Michel Lagrange, François Hild, Stéphane Roux and Christophe Voltz. In these two articles, the first on DIC, the second on its use in the context of stereo-correlation, the kinetic field basis chosen for the decomposition of the displacement field are the Q4P1 shape functions of a regular square mesh.

This global correlation method requires greater computing means than the former but offers superior accuracy.

However, even if they perform for users in a way that is satisfactory overall, these methods have certain drawbacks. These notably include a certain complexity of the calibration phase, measurement results in the form of clusters of points that it is then necessary to reshape, the need to rely on filtering or projection without being able to judge and quantify the loss of accuracy entailed, a certain sensitivity to measurement noise and, finally, difficulty in assessing the quality of the measurement obtained in the absence of any reference.

These difficulties stem partly from the fact that the measurements are made a priori, with no prior knowledge of the shape and the geometry of the object. However, today, the very large majority of industrial objects are designed and produced based on computer-assisted design software programs, also known as Computer Aided Design, known by the acronym CAD. A parametric representation of the object to be measured is therefore naturally available. The core of the stereo-correlation method according to the invention is the use of this parametric representation either during the calibration step, or during the measurement step, or during both, the object to be measured being its own template. By its very nature, the method according to the invention is akin to global correlation DIC codes.

SUMMARY OF THE INVENTION

More precisely, the subject of the invention is a method of three-dimensional measurement of an object by stereo-correlation, said method being implemented by at least two cameras connected to image processing means, said cameras being positioned so as to give a first image and a second image of the object seen from at least two different angles, the image processing means arranged so as to determine all or part of the three-dimensional coordinates of said object, said method including at least two steps:

a first step of calibration wherein, a template of known shape being arranged in the field of the cameras, the processing means compute the two transfer matrices linking the three-dimensional coordinates captured in the reference frame of the template with the two-dimensional coordinates captured in the two reference frames of the first image and of the second image and optionally the aberration corrections;

a second step of spatial matching wherein, the object to be measured being arranged in the field of the cameras, the processing means directly determine the three-dimensional shape of the object in its CAD representation by making use of the matching of the two images;

characterized in that, the object surface having a parametric representation, i.e. a mathematical representation of the object surface having the form of a decomposition over a scalar function basis, said parametric representation is implemented in the first calibration step and in the second spatial matching step.

Advantageously, the method includes a third step of temporal matching during which a plurality of pairs of first and second images are stored simultaneously at different instants and processed by the image processing means, the parametric representation being also implemented during the third temporal matching step.

Advantageously, in the first calibration step, the object is its own template.

Advantageously, the template includes a pattern composed of black and white marks of a deterministic or random shape and distribution.

Advantageously, the first image being described by a first function depending on the spatial coordinates captured in the first image plane and the second image being described by a second function depending on the spatial coordinates captured in the second image plane, the first and the second function being representative of the variation of the gray levels at each point of the first and the second image plane, the optimization of the coefficients of the two transfer matrices is carried out by means of an algorithm, the function of which is to minimize the residual correlation existing between the first function and the second function, the displacement field apparent on each image being computed over the scalar function basis of the parametric representation of the object surface and of the projective model of said object.

Advantageously, the parametric representation is composed of splines or B-splines or NURBS or is a Bézier representation, and the scalar function basis is composed of Bernstein polynomials.

BRIEF DESCRIPTION OF THE DRAWINGS

The invention will be better understood and other advantages will become apparent on reading the following non-limiting description and using the appended figures, among which.

DETAILED DESCRIPTION

As mentioned previously, the method of stereo-correlation according to the invention implements a parametric representation of the object during the calibration step and during the measurement step, the object to be measured being able to be its own template. The parametric representation is mainly output by computer-assisted design software programs.

The advantages of this method are as follows. The calibration can be performed with the help of a single pair of images, which simplifies the operating mode. The measured object is described in the same language as that which has enabled its definition. It is thus easy to quantify the deviation or error existing between the real object and its numerical definition.

By way of non-limiting exemplary implementation of the method according to the invention, a step of calibrating a system of three-dimensional measurement of an object by stereo-correlation according to the invention is detailed below.

The template is designed and produced by means of a CAD software program coupled with a computer-assisted manufacturing software program (or CAM according to the acronym). In this example, its parametric representation is a Bézier square, the scalar function basis being composed of Bernstein polynomials. More precisely, its representation $S(u,v)$ is equal to:

$$S(u,v) = \sum_{i=0}^{m} \sum_{j=0}^{n} B_{im}(u) B_{jn}(v) P_{ij} \text{ with } (u,v) \in [0,1]^2$$

wherein $(u,v)$ are the parametric coordinates, $B_{im}$ and $B_{jn}$ are Bernstein polynomials of degree m and n satisfying the following relationship:

$$B_{im}(u) = \frac{m!}{i!(m-i)!} u^i (1-u)^{m-i}$$

Such representations are notably implemented in slightly more complex versions by the branded software program CATIA marketed by Dassault Systèmes.

Other parametric representations may be used. Examples include spline or B-spline functions or else Non-Uniform Rational Basis Splines (denoted by the acronym NURBS).

Figure 1:
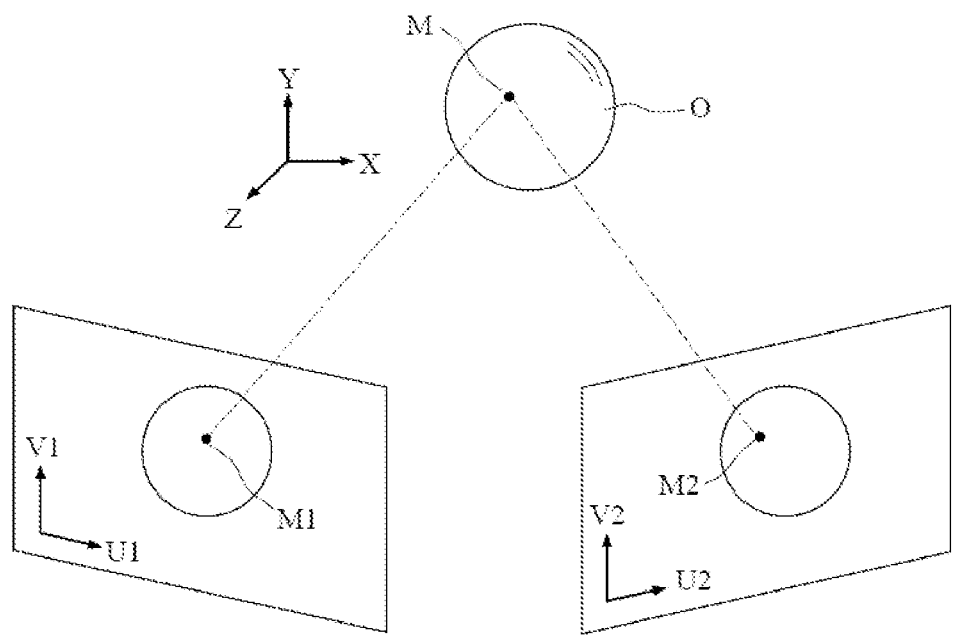
FIG. 1, already commented on, represents the general principle of three-dimensional measurement by stereo-correlation.
Figure 2:
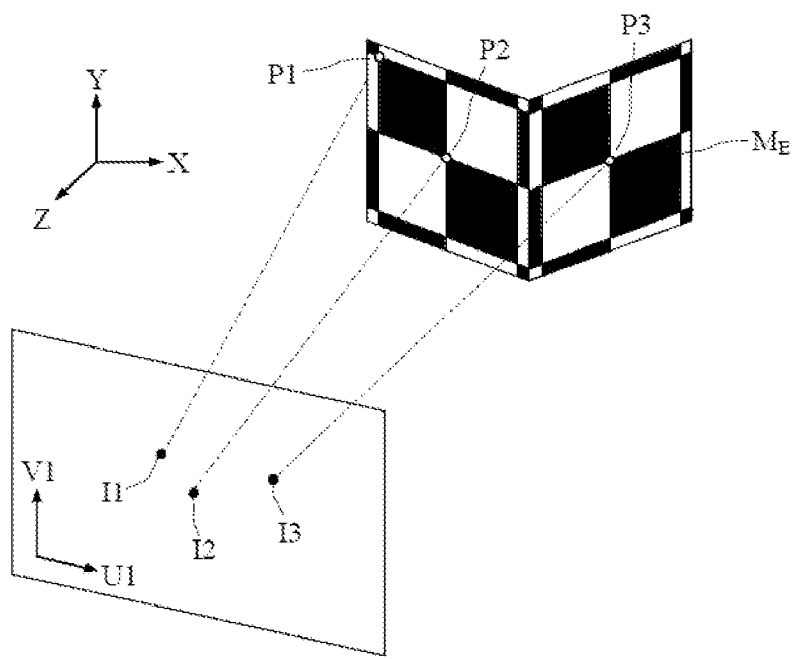
FIG. 2 already commented on, represents the general principle of the calibration step in a method of measurement by stereo-correlation.
Figure 3:
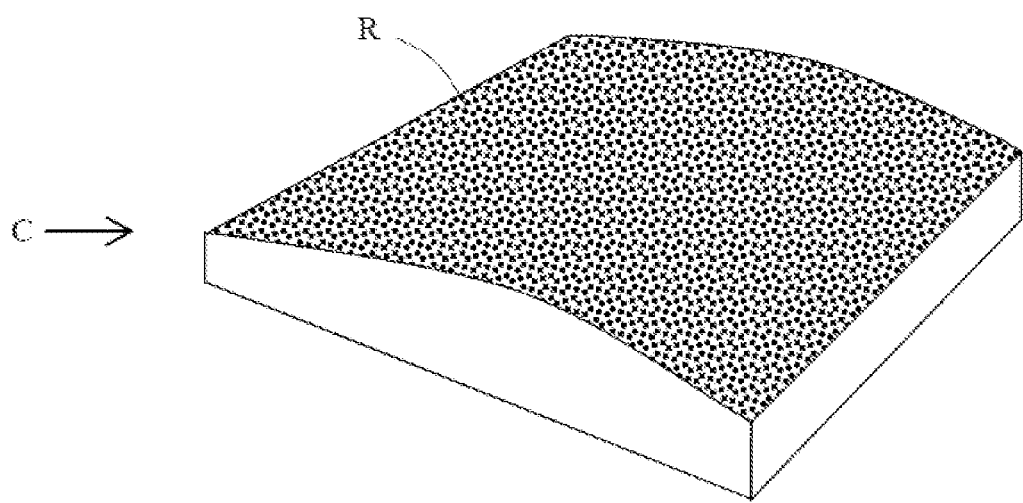
FIG. 3 represents an example of a template used in a method of measurement by stereo-correlation according to the invention.

The template includes a pattern composed of black and white marks. The shape of the marks can be either a deterministic pattern or a random distribution. In the present case, they are deposited randomly by a paint sprayer. FIG. 3 represents an example of such a template C with its spotted coating R.

Two cameras make it possible to capture the object to be measured from two different angles. Of course, a larger number of cameras can be used and matched pair-wise, either to obtain greater accuracy over part of the object or to obtain a wider capture angle. The cameras are generally high-definition without any other particular specifications. They are connected to image processing means making it possible to perform the various mathematical steps of the method. The image processing is carried out with the help of images defined by gray levels. In other words, only the brightness information of the images is used.

The various mathematical functions used are known to those skilled in the art and do not require any software resources other than those already used in the technical field of global DIC.

The template is arranged in a space referenced in a three-dimensional reference frame $(X,Y,Z)$. The two image planes of the cameras are referenced in two two-dimensional reference frames denoted $(x_r, y_r)$ and $(x_l, y_l)$.

Figure 4:
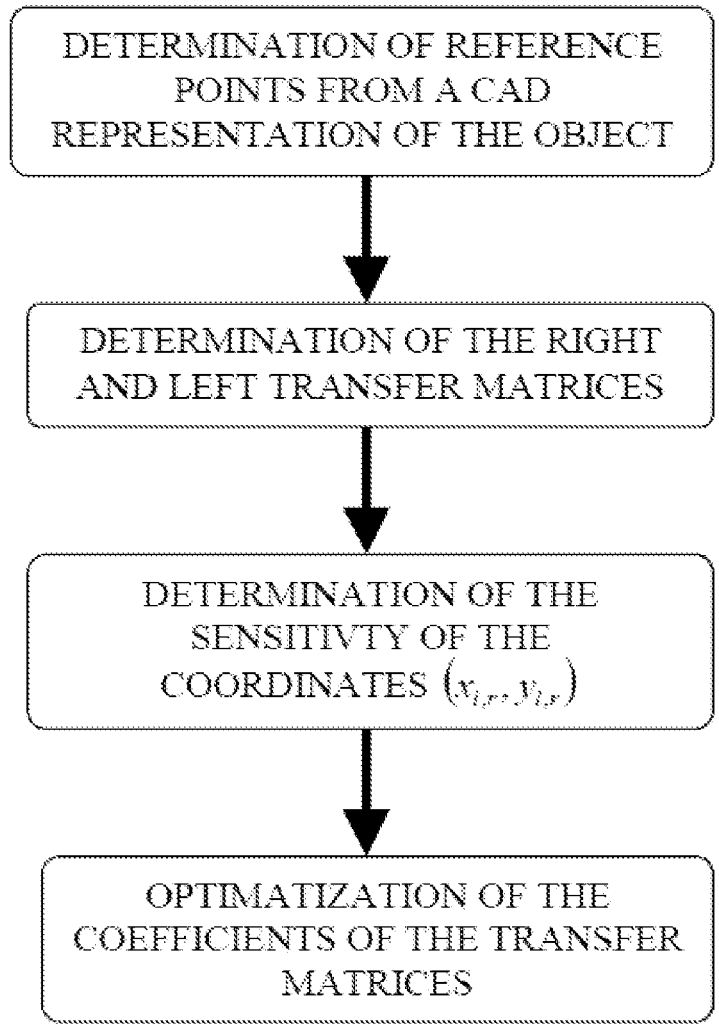
FIG. 4 represents the various sub-steps of calibration in a method of measurement by stereo-correlation according to the invention.

The various sub-steps of the calibration are represented in FIG. 4. In a first sub-step, reference points are determined. The template being in place, at least six points with known coordinates resulting from the parametric representation of the object are determined on the template. Each point has as three-dimensional coordinates $(X_i, Y_i, Z_i)$. To each point of the object there corresponds a pair of points in the two right and left image planes respectively denoted $(x_r, y_r)$ and $(x_l, y_l)$.

In a second sub-step, the transfer matrices $M_l$ and $M_r$ are determined. This gives the following relationships:

$$\begin{pmatrix} l_l x_l \\ l_l y_l \\ l_l \end{pmatrix} = M_l \begin{pmatrix} X \\ Y \\ Z \\ 1 \end{pmatrix} \text{ and } \begin{pmatrix} l_r x_r \\ l_r y_r \\ l_r \end{pmatrix} = M_r \begin{pmatrix} X \\ Y \\ Z \\ 1 \end{pmatrix} \quad \text{Relationship 2}$$

$l_l$ and $l_r$ being the scale factors existing between the image planes and the reference frame of the object which are linked in particular to the magnifications of the lenses of the cameras, the matrices $M_l$ and $M_r$ being the two transfer matrices between the three-dimensional reference frame of the object and the two-dimensional ones of the image planes. More precisely, if $m_{ij}^{l,r}$ are the parameters of the two matrices $M_l$ and $M_r$, the following relationship is obtained:

$$\begin{cases} l_{l,r} x_{l,r} = m_{11}^{l,r} X + m_{12}^{l,r} Y + m_{13}^{l,r} Z + m_{14}^{l,r} \\ l_{l,r} y_{l,r} = m_{21}^{l,r} X + m_{22}^{l,r} Y + m_{23}^{l,r} Z + m_{24}^{l,r} \\ l_{l,r} = m_{31}^{l,r} X + m_{32}^{l,r} Y + m_{33}^{l,r} Z + m_{34}^{l,r} \end{cases} \quad \text{Relationship 3}$$

Relationship 3 can also be put in the form of relationship 4

$$\begin{cases} x_{l,r} = \frac{m_{1i}^{l,r} \overline{X}_i}{l_{l,r}} \\ y_{l,r} = \frac{m_{2i}^{l,r} \overline{X}_i}{l_{l,r}} \end{cases} \quad \text{Relationship 4}$$

wherein $\overline{X}_i$ are the homogenous coordinates of the vectors $(X,Y,Z,1)$. 24 parameters $m_{ij}^{l,r}$ are therefore to be determined corresponding to the 12 parameters of the matrix $M_l$ and the 12 parameters of the matrix $M_r$. In practice, it is necessary to determine 22 parameters insofar as all the parameters are determined to within a multiplicative constant.

In a third sub-step, the sensitivity of the coordinates $(x_{l,r}, y_{l,r})$ to the parameters of the transfer matrices is determined. This sensitivity has the following form:

$$dx_{l,r} = dx_{l,r}(\tilde{m}_{ij}) + \frac{\partial dx_{l,r}}{\partial m_{ij}} dm_{ij} \quad \text{Relationship 5}$$

In this relationship, the term, $dx_{l,r}$ corresponds to the apparent displacements of the image points in the two image planes if one of the parameters $m_{ij}^{l,r}$ of the transform matrices is modified.

In a fourth sub-step of optimization, the determination of the coefficients of the transfer matrices is refined.

The first image is described by a first function $f(x_l)$ depending on the spatial coordinates $x_l$ captured in the first image plane and the second image being described by a second function $g(x_r)$ depending on the spatial coordinates captured in the second image plane, the first and the second function being representative of the variation of the gray levels at each point of the first and of the second image plane. The preservation of the gray levels from one image to the other implies that, for a pair of points belonging to the two image planes and representing the same point of the object:

$$f(x_l+dx_l)=g(x_r+dx_r) \quad \text{Relationship 6}$$

At the cost of a Taylor expansion, which is part of the conventional methods used in global approach DIC methods, relationship 6 becomes relationship 7 below:

$$f(x_l)+\nabla f \cdot dx_l = g(x_r)+\nabla g \cdot dx_r \quad \text{Relationship 7}$$

The correlation residual T existing between the first function and the second function is computed over the scalar function basis of the parametric representation of the object surface. It has a value of:

$$T=\int (f(x_l)-g(x_r))^2 du\,dv \quad \text{Relationship 8}$$

An iterative procedure is implemented so as to minimize this residual. This procedure is akin to that mentioned in the article by Gilles Bernard, François Hild and Stéphane Roux published in "Experimental Mechanics 46 (2006) 789-804" and already mentioned in this description. The crucial modification being that the chosen function basis results here from the projective model and the shape of the template and not finite-element shape functions.

The calibration method above is applicable, at the cost of adaptations within the reach of those skilled in the art, to the spatial matching phases or to the temporal matching phases of methods using stereo-correlation or 3D-DIC Digital Image Correlation. An additional temporal regularization can be carried out for the purposes of a spatio-temporal determination of the 3D surface displacement fields.

The advantages of the method according to the invention are many. Among others, they include: fewer variables to be determined and therefore a lesser uncertainty in the results, control of the residual maps which improves the quality of the representation, regularity of the field, absence of steps of smoothing or filtering of the displacement fields. Moreover, a dense residual field makes it possible to evaluate the quality of the determination of the various kinetic degrees of freedom.

The invention claimed is:

1. A method of three-dimensional measurement of an object by stereo-correlation, said method being implemented by a measurement system comprising at least two cameras connected to image processing means, said at least two cameras being positioned so as to capture at least a first image and a second image of the object seen from at least two different angles, the image processing means being configured to determine all or part of three-dimensional coordinates of said object, said method including at least two steps:
a first step of calibration of the measurement system wherein, a template of known shape being arranged in a field of the at least two cameras, the image processing means being configured to compute at least two transfer matrices linking the three-dimensional coordinates captured in a reference frame of the template with two-dimensional coordinates captured in at least two reference frames of the first image and of the second image of said template;
a second step of spatial matching wherein, the object to be measured being arranged in the field of the at least two cameras, the image processing means being configured to determine a whole displacement field existing between the at least two images of said object to be measured, making it possible to obtain a smallest possible difference between said images;
wherein, an object surface and a surface of the template having a parametric representation that comprises a mathematical representation of the surface having a form of a decomposition over a scalar function basis, said parametric representation is implemented in the first calibration step and in the second spatial matching step.

2. The method of three-dimensional measurement of an object as claimed in claim 1, wherein the method includes a third step of temporal matching during which a plurality of pairs of first and second images are stored simultaneously at different instants and processed by the image processing means.

3. The method of three-dimensional measurement of an object as claimed in claim 2, wherein the parametric representation is also implemented during the third temporal matching step.

4. The method of three-dimensional measurement of an object as claimed in claim 1, wherein, in the first calibration step, the object is its own template.

5. The method of three-dimensional measurement of an object as claimed in claim 1, wherein the template includes a pattern composed of black and white marks of a deterministic or random shape and distribution.

6. The method of three-dimensional measurement of an object as claimed in claim 1, wherein, the first image being described by a first function depending on spatial coordinates captured in a first image plane and a second image being described by a second function depending on spatial coordinates captured in a second image plane, the first and the second function being representative of a variation of gray levels at each point of the first and the second image plane, an optimization of coefficients of the two transfer matrices is carried out by means of an algorithm, a function of which is to minimize a residual correlation existing between the first function and the second function, an apparent displacement field being computed over the scalar function basis of the parametric representation of the object surface and of a projective model of the object.

7. The method of three-dimensional measurement of an object as claimed in claim 1, wherein the parametric representation is composed of splines or B-splines or NURBS or is a Bézier representation.

8. The method of three-dimensional measurement of an object as claimed in claim 7, wherein the scalar function basis is composed of Bernstein polynomials.

* * * * *